United States Patent Office 2,948,930
Patented Aug. 16, 1960

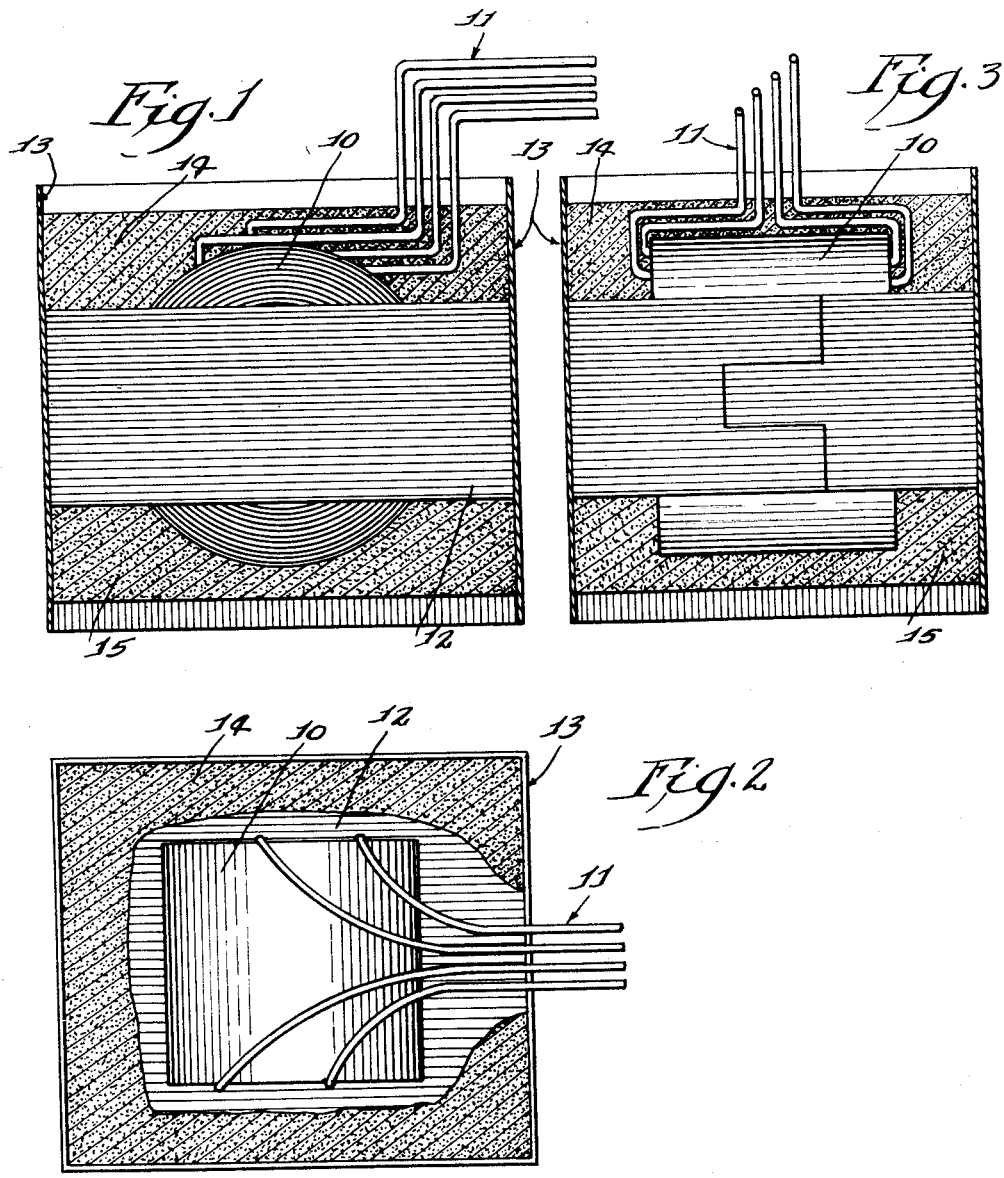

2,948,930

METHOD OF POTTING ELECTRICAL EQUIPMENT

Clarence A. Herbst, Park Ridge, Ill., assignor to Biwax Corporation, a corporation of Illinois Filed Aug. 9, 1955, Ser. No. 527,225

3 Claims. (Cl. 18—59)

This invention relates to a method of potting electrical apparatus.

Electrical equipment such as small transformers suitable for use in radio could be reduced in size provided efficient and adequate means for dissipating heat which is generated within the transformer during its use could be found. In the past, the ends of the transformer around the coil portions outside of the core have been covered with an electrical insulating, moisture-proofing material or potting compound. These materials have usually been thermoplastic with a melting temperature within the range of 190° to 250° F.

The present invention is concerned with providing in electrical equipment a potting compound which has electrical insulating and moisture-proofing qualities and at the same time has very high heat conductive properties. By using the method of potting of the present invention to form a potting compound, heat formed within a transformer, for instance, can be dissipated quite rapidly to the exterior of the transformer casing or box where it can be carried off into the surrounding air. This ability to dissipate heat generated within the electrical equipment permits the equipment to be built in smaller sizes, thus occupying less space. The industry is striving toward smaller units so that equipment may be built to occupy less space. One of the prime considerations is the dissipation of heat generated within the units. The potting compound of this invention contributes greatly to the ability to dissipate such generated heat.

It is the primary object of this invention to provide a new and improved potting method resulting in a potting compound of high heat conductive quality.

It is a further object of this invention to provide a new method of applying and forming a highly heat conductive potting compound in electrical equipment.

Still another object of the invention is to provide a potting compound consisting primarily of a mass of inorganic non-metallic particles compacted to maximum density and bound together with a resinoid.

Other objects, features and advantages of the present invention will be apparent from the following description of an exemplary embodiment taken in conjunction with the accompanying drawings, in which:

Figure 1 is a side elevational view of a transformer suitable for use in television receivers with a side of the retaining box removed to show the placement of the potting compound of this invention therein;

Figure 2 is a top plan view, partially broken away, of the transformer illustrated in Figure 1 with the cover removed to expose the potting compound; and Figure 3 is a front elevational view of the transformer shown in Figures 1 and 2 with the front of the retaining box removed to show the interior structure.

While this invention is susceptible of embodiments in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Potting compounds have been used in electrical equipment to retain leads, mounting devices, and electrical components, in place against shorting and displacement from proper position. Most of these compounds have been thermoplastic materials so that they could be removed by raising the temperature to liquefy the compound. In contrast to the accepted procedures heretofore, the present invention contemplates a potting compound of dissimilar materials, one a highly heat conductive granule or particle, and a binder of thermo-reactive resin.

As illustrated in the drawings, a transformer suitable for electronic equipment is provided with a potting compound on either side of the core for the purpose of holding the core and coil in proper relation and also for dissipating heat generated in the coil. The particular transformer illustrated is one presently found in current television receivers. The coil 10 is formed of windings insulated one from the other by a carefully purified kraft paper in the usual manner. The coil and insulating paper are impregnated with a varnish or resin to electrically insulate the coils and moisture-proof them. Electrical leads or taps 11 are generally taken from the coil and led to one end of the transformer where they would ordinarily pass out through a hole in a cover member (not shown). The core 12, of suitable ferrous material, is formed in laminations and two sections so that they may be assembled in and around the coil by mere physical movement of the sections toward each other with the coil between them. The core and coil are mounted within a retaining box 13 of metallic sheet metal. The box is open at either end and is usually provided with a cover, which has been removed from the drawings in order to illustrate the structure more clearly. The present invention is concerned only with the potting compound itself.

In Figure 1, a mass of the potting compound is shown on either end of the transformer and the mass 14 at the top extending around the electrical leads or taps 11 and the mass 15 on the other end of the coil extending about the exposed portions of the coil below the core.

In accordance with one embodiment of the present invention, a sand was graded on screens so that a uniform mesh size was obtained. All sand that would pass a 16-mesh screen and would be retained on a 20-mesh was retained and thoroughly dried. Ordinarily, the sand for these purposes is considered dry if it contains 0.5% or less moisture. The dry sand was placed in the space to be occupied by the potting compound within the transformer box 13 and then vibrated sufficiently to settle the grains into a compacted form. The vibration was continued until such time as it was apparent visually that no further compacting of the sand grains would occur and that the grains had settled to their maximum density.

Following the above procedure, a thermo-reactive resin, ordinarily liquid at room temperature, was slowly poured into the compacted sand grains so that it flowed throughout the mass. After the resin was completely dispersed throughout the sand particles, it was thermally reacted by raising the temperature to the rang of 125° to 150° F. for a sufficient time to react the resin.

The final potting compound obtained by following the above method was found to contain from 80 to 85% by weight of the sand grains and to have a specific gravity of about 2.7. This material was found to conduct heat away from the coil of the transformer in a greater amount than was capable with previously used potting compounds. Tests indicate that the coil or winding of the transformer was maintained at a temperature 10° C. less than was possible with the previous compounds.

Other inorganic non-metallic particles in addition to sand many be suitable for use in the potting compound. The granular material used should be highly heat conductive and at the same time electrically insulating in character. The resins which may be used may be any one of a class of polyester resins, epoxy resins or phenolic resins. It is preferred that the specific gravity of the potting compound be within the range of 2.5 to 3.0. The particular nature of the silica or other granular material used may have some bearing on the specific gravity of the final product. In any event, the specific gravity of the mass may be increased by treating the binding resin with heat conductive material prior to its incorporation with the sand or other granular material. It has been found that the resin may be loaded with as much as 50% by weight of amorphous silica. This will increase the specific gravity of the mass and also increase the heat conductivity since the spaces between the sand grains are thus not only filled with the binder resin but contain heat conductive material as well.

It is desirable to place as much sand or granular material as possible in the final potting compound mass since the sand is the primary heat conducting material. Sand is generally not expensive as compared to the binding resin. It is preferred to use granules of a uniform size since a greater density within the mass can be obtained with uniform size particles.

The present invention may be used with various electronic apparatus where heat conductive properties of a potting compound are needed, for example, in radio as broadly construed.

Specific examples of heat conductive compounds made in accordance with the invention with resinoid binders formed with commercially available resins, are as follows:

(I) Sand of the grade normally used in concrete work was graded to uniform particle size by passing it through screens. Only particles that would pass a 16-mesh screen and be retained on a 20-mesh screen were used in the compound. The space to be occupied by the heat conductive compound was filled with the graded sand and vibrated to its maximum density. Then a resin of the polyester family, "Paraplex" obtained from Rohm & Haas, was poured into the sand in amount to fill the interstices. Heat was applied to thermally react the resin.

(II) The same procedure was followed as set out in Example I except that a resin of the epoxy family, "Epon," obtained from Shell Chemical Company, was used as the binder.

(III) The same procedure was followed as set out in Examples I and II except that a phenolic resin, "Marbelette" obtained from Marbelette Corp., was used.

Each of the binding resinoids are satisfactory to hold the sand particles together. The sand is the principal heat conductive agent in the compound and any resinoid that will hold the sand particles in compacted form will provide a compound having the advantages of the invention.

I claim:

1. The method of forming a highly heat conductive potting compound in electrical equipment comprising, the steps of filling the space to be occupied by the compound with dry heat conductive granular inert inorganic non-metallic particles of generally uniform size, vibrating the granules to substantially maximum density, dispersing a liquid resinoid substantially throughout the voids between the compacted granules without substantially affecting the compacted state of said particles and then solidifying the resinoid to form a solid mass of potting compound.

2. The method of forming a highly heat conductive potting compound in electrical equipment comprising the steps of filling the space to be occupied by the potting compound with dry sand particles ranging in size from about 16 to 20 mesh, vibrating the sand particles to a substantially maximum density of the particles substantially throughout the space, flowing liquid thermo-reactive resin into the compacted sand to fill all space between the particles without substantially affecting the compacted state thereof and then thermally reacting the resin to infusibility to form a solid mass.

3. The method of claim 2 including the step of loading the resin with amorphous silica to about 50% by weight of the resin prior to dispersing the resin throughout the sand particles.

References Cited in the file of this patent

UNITED STATES PATENTS

| | | |
|---|---|---|
| 1,935,885 | Meissner | Nov. 21, 1933 |
| 1,947,085 | Hill et al. | Feb. 13, 1934 |
| 2,395,216 | Fitzpatrick | Feb. 19, 1946 |
| 2,464,568 | Flynn | Mar. 15, 1949 |
| 2,795,009 | Gosnell et al. | June 11, 1957 |